(12) United States Patent
Giltner et al.

(10) Patent No.: US 10,738,997 B2
(45) Date of Patent: Aug. 11, 2020

(54) METHOD AND APPARATUS FOR VERIFICATION OF TDLAS SYSTEM OPERATION

(71) Applicant: John Zink Company, LLC, Tulsa, OK (US)

(72) Inventors: Dave Giltner, Boulder, CO (US); Andrew D. Sappey, Lakewood, CO (US)

(73) Assignee: ONPOINT TECHNOLOGIES, LLC, Wichita, KS (US)

( * ) Notice: Subject to any disclaimer, the term of this patent is extended or adjusted under 35 U.S.C. 154(b) by 124 days.

(21) Appl. No.: 16/092,992

(22) PCT Filed: Mar. 21, 2017

(86) PCT No.: PCT/US2017/023392
§ 371 (c)(1),
(2) Date: Oct. 11, 2018

(87) PCT Pub. No.: WO2017/180297
PCT Pub. Date: Oct. 19, 2017

(65) Prior Publication Data
US 2019/0128520 A1    May 2, 2019

Related U.S. Application Data

(60) Provisional application No. 62/321,634, filed on Apr. 12, 2016.

(51) Int. Cl.
*F23N 1/02* (2006.01)
*G01N 21/39* (2006.01)
(Continued)

(52) U.S. Cl.
CPC ............. *F23N 1/025* (2013.01); *B01D 53/30* (2013.01); *F23N 5/00* (2013.01); *F23N 5/003* (2013.01);
(Continued)

(58) Field of Classification Search
CPC . F23N 1/025; F23N 5/00; F23N 5/003; F23N 5/242; B01D 53/30; G01N 21/39
(Continued)

(56) References Cited

U.S. PATENT DOCUMENTS 6,058,131 A * 5/2000 Pan ...................... H01S 5/0687
372/102
6,282,340 B1    8/2001 Nasu et al.
(Continued)

FOREIGN PATENT DOCUMENTS

WO    2007/041670 A1    4/2007

OTHER PUBLICATIONS

International Search Report & Written Opinion for corresponding PCT Application PCT/US2017/023392, dated Oct. 19, 2017, 8 pages.
(Continued)

*Primary Examiner* — Vivek K Shirsat

(57) ABSTRACT

Sensing of gas species characteristics within a process chamber includes selectively projecting a beam of a first select lasing frequency therethough. The beam is optically coupled to a detector to detect a process transmission spectrum having an absorption dip at a select lasing frequency caused by a gas species characteristic. The beam is selectively projected through a fiber Bragg grating which is formed in an optical fiber core to partially reflect at least a portion of the beam of the first select lasing frequency while passing a remainder of the beam. The remainder of the beam has an FBG transmission spectrum mimicking the absorp-
(Continued)

tion dip at or near the select lasing frequency caused by a gas species characteristic of interest. It is optically coupled the detector. Outputs of the detector are monitored to compare the FBG transmission spectrum to any process transmission spectrum produced in the process chamber.

13 Claims, 2 Drawing Sheets

(51) Int. Cl.
    *B01D 53/30*     (2006.01)
    *F23N 5/00*     (2006.01)
    *F23N 5/24*     (2006.01)

(52) U.S. Cl.
    CPC .............. *F23N 5/242* (2013.01); *G01N 21/39* (2013.01); *B01D 2258/0283* (2013.01); *F23N 2900/05001* (2013.01); *F23N 2900/05002* (2013.01); *G01N 2201/0612* (2013.01); *G01N 2201/0833* (2013.01)

(58) Field of Classification Search
    USPC .......................................... 431/12, 18, 75–76
    See application file for complete search history.

(56) References Cited

U.S. PATENT DOCUMENTS

2003/0218124 A1    11/2003    Johnson
2008/0074645 A1*    3/2008    Sappey ................. G01J 3/0297
                                                                                 356/51
2008/0285916 A1    11/2008    Sappey et al.

OTHER PUBLICATIONS

Extended European search report and opinion received for EP application No. 17782809.2, dated Nov. 5, 2019, 9 pages.

* cited by examiner

METHOD AND APPARATUS FOR VERIFICATION OF TDLAS SYSTEM OPERATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

This disclosure is directed to a Tunable Diode Laser Spectroscopy (TDLAS) system, and more particularly to an apparatus and method for verification of a TDLAS system operation.

BACKGROUND

Tunable Diode Laser Spectroscopy (TDLAS) is widely used in both laboratory and industrial applications in which gas species characteristics, such as temperature or concentration, must be measured. A TDLAS system consists of one or more diode lasers each producing light at carefully controlled wavelengths which are projected into a process chamber to measure specific gas-phase molecules. Each laser's wavelength is typically tuned over a narrow wavelength interval encompassing the entire Gaussian spectral envelope, the envelope having a peak at a select wavelength (collectively referred to herein as a "select wavelength") and the amount of transmitted light across the select wavelength is measured. Gas phase species that absorb some of the light cause a dip in the amount of transmitted light as the wavelength is scanned (an "absorption dip") and quantification of the absorption dip allows one to calculate the concentration of the species with knowledge of the path length and a coefficient that describes the amount of light absorbed at a select wavelength and temperature. The absorption dip spectrum or pattern of a molecule can be thought of as a fingerprint. The pattern of absorption versus wavelength is a characteristic feature of each molecule and therefore TDLAS can be quite selective—detecting the species of interest in an environment rife with other molecules.

One important application of TDLAS systems is for combustion monitoring and diagnostics. Combustion is used to drive many industrial processes from power generation to steel and glass production. Refineries and petrochemical plants use combustion to drive reactions toward completion. TDLAS systems have become quite complex in some cases, and they are being fielded for industrial applications in which process efficiency, reliability, and safety are paramount. Combustion species of interest include $O_2$, CO, $CO_2$ and $H_2O$, all of which can be measured using TDLAS. In addition, temperature can be measured using line ratio techniques as known in the art. The TDLAS data can be used in a control loop to vary the fuel/air mixing ratio to optimize a combustion process efficiency while simultaneously insuring that safe operating conditions are maintained. Failure of, or erroneous results from, the TDLAS system when used for combustion optimization can have catastrophic results. To some extent, this problem can be mitigated via smart process control design; however, risk remains. As a consequence, a method of system calibration and system operation verification is desired to make sure that the TDLAS system is functioning properly and the data that is being generated is accurate and reliable.

One known means of TDLAS system verification is to provide a gas-phase sample for the system to measure in an environment that mimics an environment in which measurements are being made. In the simplest of cases, a small, sealed spectroscopy cell with windows for the laser beam to pass through and a select gas species in the cell at the desired temperature, pressure and concentration can be used to verify that the system is measuring properly. However, for elevated combustion temperatures a sealed spectroscopy cell won't work well since the pressure will rise as the temperature rises and the details of the absorption spectrum are sensitive to pressure. In lieu of a sealed cell, a flowing cell can be used as a calibration and verification standard. The flowing cell can be heated to near combustion temperatures and gas mixtures approximating the combustion environment can be introduced. In practice, this type of system works well in a laboratory test environment and can be used for system validation. However, such a system represents a large investment of a minimum of tens of thousands of dollars. Furthermore, it is not portable or particularly user friendly. Most importantly, it would be extremely expensive to modify such a system for use outside a controlled laboratory environment.

Needed is an inexpensive, durable and field deployable way to verify a TDLAS system is working properly and producing reliable results. The necessary TDLAS system and method must produce a reference absorption pattern or spectrum mimicking an absorption dip at or near the select lasing frequency of the gas species of interest. Frequent comparison of the reference transmission spectrum with the spectrum produced by the target species allows any changes to be noted. As long as the reference absorption spectrum does not change as a function of time or any other parameter, the comparison allows the user to determine the health of the system. The reference absorption spectrum should be produced by a package that is small, light and solid phase and does not change over time. Theoretically, one way of providing such a reference absorption pattern is a thin film filter which uses interference between many layers of varying refractive index and thickness to filter light in a given bandwidth. Although theoretically achievable, difficult and costly research and development would be necessary to make the thin-film filter concept a reality.

The present invention is directed toward overcoming one or more of the problems discussed above.

SUMMARY OF THE EMBODIMENTS

Disclosed is a sensing apparatus comprising at least one diode laser producing an output beam of a first select lasing frequency coupled to an input of an optical fiber. A pitch side beam controller comprising at least one of a beam splitter or an optical switch has at least one input optically coupled to an output of the optical fiber and at least two outputs. At least one of the at least two outputs is optically coupled to a pitch optic operatively associated with a process chamber and oriented to project the output beam of the at least one diode laser through the process chamber. A catch is optic operatively associated with the process chamber in optical communication with the pitch optic to receive the output beam of the at least one diode laser projected through the process chamber. A catch side optical fiber is provided having an input side optically coupled to each catch optic and an output side. A catch side beam controller comprising an optical switch has at least two inputs and one output. The output side of the catch side optical fiber is optically coupled to one of the inputs. A detector is optically coupled to the beam controller output, the detector being sensitive to the select lasing frequency. An FBG optical fiber having an input and an output comprises at least one fiber Bragg grating formed in a core of the FBG optical fiber. The at least one fiber Bragg grating is configured to partially reflect a laser beam of the first select lasing frequency while passing at least a portion of the laser beam. The remainder of the laser beam has a FBG transmission pattern mimicking an absorption dip at or near the select lasing frequency caused by a gas species characteristic of interest. The FBG optical fiber input is optically coupled to another one of the at least two outputs of the pitch side beam controller and the FBG optical fiber output is optically coupled to an input of the catch side beam controller.

Another aspect of the invention is a method of sensing gas species characteristics within a process chamber. The method includes the step of providing a process chamber and selectively projecting a beam of a first select lasing frequency though the process chamber. The beam projected through the process chamber is optically coupled to a detector sensitive to the select lasing frequency to detect a process transmission spectrum having an absorption dip at the select lasing frequency caused by a gas species characteristic of interest. The beam is also selectively projected through a fiber Bragg grating formed in a core of an optical fiber, the fiber Bragg grating being configured to partially reflect at least a portion of the laser beam of the first select lasing frequency while passing a remainder of the laser beam. The remainder of the laser beam has an FBG transmission spectrum mimicking the absorption dip at or near the select lasing frequency caused by a gas species characteristic of interest. The remainder of the laser beam is optically coupled the detector. Outputs of the detector are monitored to compare the FBG transmission spectrum to any process transmission spectrum produced in the process chamber.

Fiber Bragg gratings offer the ability to produce an absorption dip at a specified wavelength, of a specified amplitude with a controllable spectral width in an extremely simple, lightweight package. The grating is written into the core of a single mode fiber, typically by exposing a mask created through a photolithography process with an excimer laser. The resulting periodic damage to the core creates a periodic refractive index variation that acts as a grating reflecting some wavelengths and transmitting others depending on the grating period, the scale of the refractive index variation and the amount of chirp in the grating (variation in period across the grating). Fiber Bragg gratings are used for a variety of purposes including: dispersion compensation in telecommunications systems, wavelength filtering in telecommunications (add/drop filters), and wavelength selection for fiber lasers among other uses. Unlike most wavelength selection/filtering applications, the present disclosure uses a fiber Bragg grating that is not 100% efficient. The fiber Bragg grating transmits 100% of the light outside a relevant bandwidth of the molecule of interest. However, within the relevant bandwidth, the FBG grating reflects a fraction of the incident light creating a facsimile of an absorption dip at or near the select lasing frequency caused by a gas species characteristic of interest.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
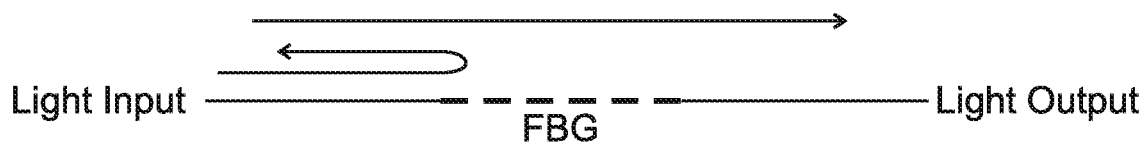
FIG. 1 is schematic representation of the effect of a fiber Bragg grating tuned to a select frequency in an optical fiber on a beam of laser light at the select frequency transmitted through the optical fiber.
Figure 2:
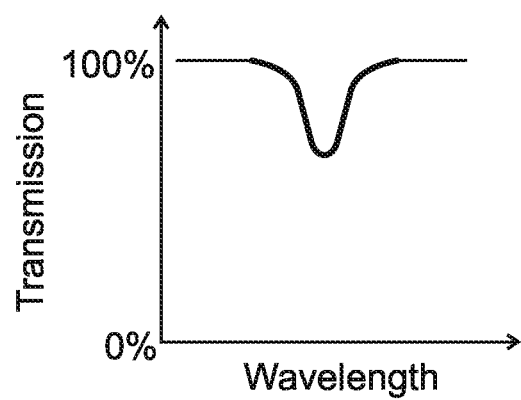
FIG. 2 is a conceptual plot of transmission versus wavelength illustrating a fiber Bragg grating as depicted in FIG. 1 creating a transmission spectrum mimicking an absorption dip of a target molecule at or near the select lasing frequency range.

FIG. 1 is a schematic representation of a fiber Bragg grating and FIG. 2 is a conceptual plot of transmission versus wavelength illustrating a fiber Bragg grating transmission pattern mimicking an absorption dip at or near the select lasing frequency caused by a gas species of interest.

Figure 3:
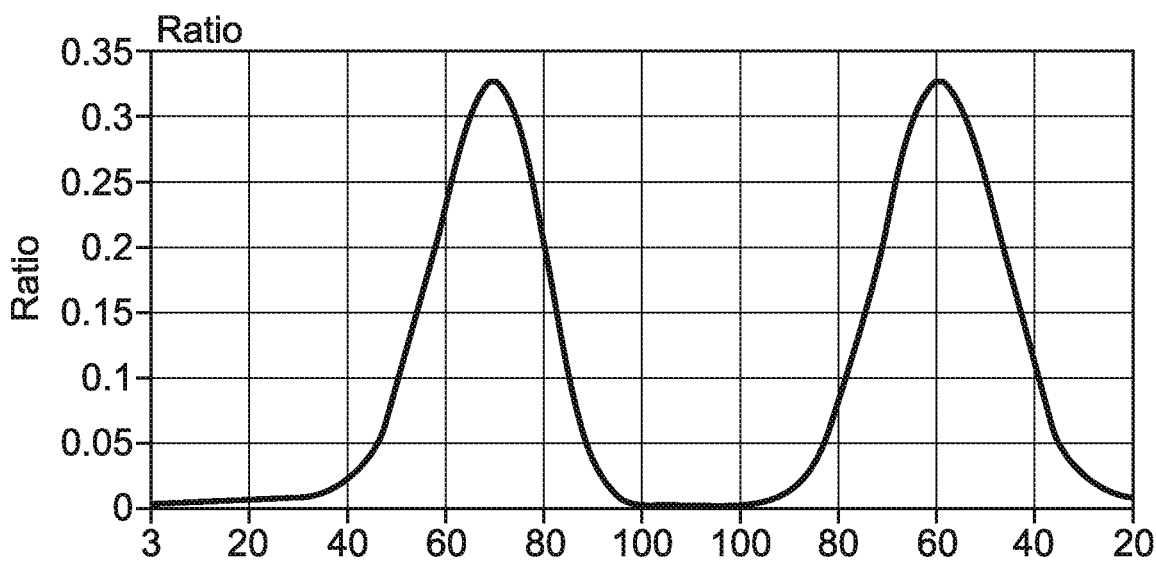
FIG. 3 illustrates the repeatability of a transmission pattern of a fiber Bragg grating mimicking an absorption dip at a select lasing frequency caused by a gas species characteristic of interest.

FIG. 3 illustrates that a transmission pattern produced by a fiber Bragg grating and mimicking an absorption dip is repeatable. The scan on the left and right are mirror images of each other obtained by first increasing the laser wavelength toward longer wavelengths producing the indicated transmission pattern and then reversing the plot from longer wavelengths to shorter wavelengths. The spectrum is identical on the up and down scans and the peak occurs at exactly the same wavelength. Such a grating can be used as a system verification standard because the wavelength, amplitude and width of the peak do not change with time. In addition to use for system verification, the fiber Bragg grating could be used for calibrating a TDLAS system.

Figure 4:
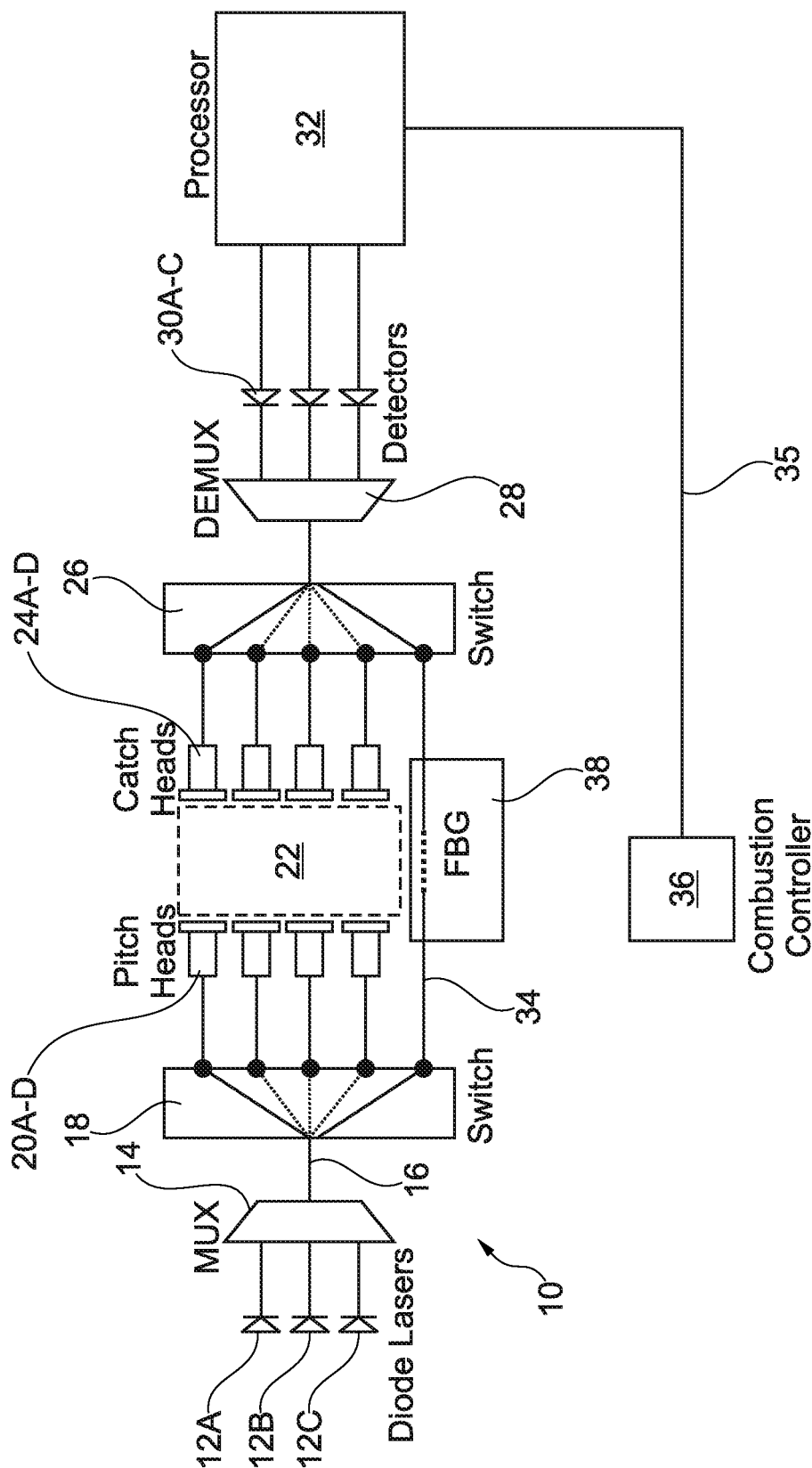
FIG. 4 is schematic representation of an embodiment of a TDLAS system including the method and apparatus for verification of proper operation as disclosed herein.

FIG. 4 is a schematic representation of one embodiment of a TDLAS system including the method and apparatus for verification of proper operation. The TDLAS system as illustrated comprises three diode lasers 12A, 12B and 12C, each producing an output beam of a distinct select lasing frequency. As used herein, "select lasing frequency" means a beam output having a narrow Gaussian spectral width with a peak at a specific lasing frequency, as is understood in the art. Each of the diode lasers 12A, 12B and 12C are optically coupled to a wavelength multiplexer 14 that combines the beams to a single multiplexed output beam 16. The multiplexed output beam 16 is optically coupled to a pitch side beam controller 18 configured to direct a beam of the multiplexed light to multiple pitch heads 20A-D. In one embodiment the pitch side beam controller is an optical switch having at least an output corresponding to each of the pitch heads 20A-D and the multiplexed beam 16 is selectively directed to each of the pitch heads 20A-D. In another embodiment, the pitch side beam controller can be a beam splitter directing a portion of the beam to each of the outputs for coupling with the pitch heads 20A-D. The pitch heads 20A-D are configured to project at least a portion of the output beam of the diode lasers 12A-C through a process chamber 22 to a corresponding catch head 24A-D. Each of the catch heads 24A-D in turn is in optical communication with an input of a catch side beam controller 26 in the form of an optical switch for selectively communicating the various catch heads 24A-D with an output of the beam controller. The beam controller 26 in turn is coupled to a demultiplexer 28 which wavelength demultiplexes the beams according to wavelength and transmits portions of the various select lasing frequencies which in turn are optically coupled to corresponding detectors 30A-C. Each detector 30A-C is coupled to a processor 32. Electrical signals from each detector 30A-C are typically digitized and analyzed in processor 32. The digitized and analyzed data can be used to sense physical parameters within the process chamber including but not limited to the concentrations of various gas species and the combustion temperature within the process chamber. Embodiments could include the processor 32 being used to send signals through a feedback loop 35 to combustion controller 36 operatively associated with the process chamber and thereby actively control select process parameters within the process chamber 22.

The sensing apparatus 10 is further provided with a FBG optical fiber 34 comprising a fiber Bragg grating configured to partially reflect a laser beam of a select lasing frequency produced by one of the diode lasers 12A-C. The remainder of the laser beam has an FBG transmission pattern mimicking the absorption dip at or near the select lasing frequency caused by a gas species characteristic of interest detected within the process chamber 22. Embodiments of the FBG optical fiber could include a plurality of fiber Bragg gratings in series, with each fiber Bragg grating being configured to partially reflect a laser beam of a discrete select lasing frequency produced by two or more of the diode lasers 12A-C. The remainder of the laser beam has an FBG transmission pattern mimicking the absorption dip at or near the select lasing frequency caused by a gas species characteristic of interest detected within the process chamber 22. In all embodiments the FBG optical fiber input is optically coupled to an output of the pitch side beam controller 18 and an output of the FBG optical fiber is coupled to an input of the catch side beam controller 26. In this manner the multiplexed beam 16 is passed through the FBG optical fiber in conjunction with the multiplexed beam 16 being passed through the to pitch heads 20A-D, the process chamber 22 and the catch heads 24A-D.

The example of the sensing apparatus 10 illustrated in FIG. 4 could have more or less diode lasers and corresponding detectors and further could have more or less pitch head and catch head pairs and thus the sensing apparatus 10 is scalable to various applications. At a bare minimum, a single diode laser is provided which would obviate the need for the wavelength multiplexer 14 and demultiplexer 28 and in such an embodiment the FBG optical fiber 34 would require only a single fiber Bragg grating operative with the select lasing frequency of the single diode laser.

Embodiments could also include a temperature control unit 38 for maintaining the FBG optical fiber 34 or the fiber Bragg gratings therein within a select temperature range to prevent substantial variation of the optical properties of each fiber Bragg grating in the FBG optical fiber. For example, the temperature control unit could maintain the temperature of the fiber Bragg gratings to within plus or minus 0.5 degrees Fahrenheit.

Embodiments could include the processor 32 being in communication with a combustion controller 36 to control combustion inputs such as fuel and air if the processor 32 detects combustion characteristics such as the concentration of gas phase species being monitored or temperature are deviating from necessary specifications. Such embodiments could also include the processor comparing the detected transmission patterns of the laser beams from the process chamber to that of the FBG absorption dips of the fiber Bragg gratings, with the processor producing a warning signal or even shutting down the combustion process in the event of an unacceptable deviation therebetween.

Various modifications and additions can be made to the embodiments discussed without departing from the scope of the invention. For example, while the embodiments described above refer to particular features, the scope of this invention also included embodiments having different combination of features and embodiments that do not include all of the above described features.

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

What is claimed is:

1. A sensing apparatus comprising:
   at least one diode laser producing an output beam of a first select lasing frequency optically coupled to an input of an optical fiber;
   a pitch side beam controller comprising at least one of a beam splitter or an optical switch, the beam controller having at least one input optically coupled to an output of the optical fiber and at least two outputs;
   at least one of the at least two outputs being optically coupled to a pitch optic operatively associated with a process chamber and oriented to project the output beam of the at least one diode laser through the process chamber;
   a catch optic operatively associated with the process chamber in optical communication with the pitch optic to receive the output beam of the at least one diode laser projected through the process chamber;

a catch side optical fiber having an input side optically coupled to the catch optic and an output side;

a catch side beam controller comprising an optical switch having at least two inputs and one output;

a detector optically coupled to the beam controller output, the detector being sensitive to the select lasing frequency;

a FBG optical fiber having an input and an output, the FBG optical fiber comprising at least one fiber Bragg grating formed in a core of the FBG optical fiber, the at least one fiber Bragg grating being configured to partially reflect a laser beam of the first select lasing frequency while passing at least a portion of the laser beam to the FBG optical fiber output, the FBG optical fiber input being optically coupled to another one of the at least two outputs of the pitch side beam controller and the FBG optical fiber output being optically coupled to an input of the catch side beam controller.

2. The sensing apparatus of claim 1 further comprising:
a temperature control unit operatively associated with the each fiber Bragg grating of the FBG optical fiber to maintain each fiber Bragg grating at select temperature range, the select temperature range preventing substantial variation of optical properties of each fiber Bragg grating.

3. The sensing apparatus of claim 2 wherein the select temperature range is plus or minus 0.5 degrees Fahrenheit.

4. The sensing apparatus of claim 1 further comprising:
a plurality of diode lasers each producing an output beam of a distinct select lasing frequency each coupled to an input of a distinct optical fiber;
a multiplexer optically coupled to each distinct optical fiber output configured to combine the output beam of each of the plurality of diode lasers to a multiplexed beam;
a demultiplexer optically coupled to the output of the catch side beam controller configured to separate each output beam by its distinct lasing frequency; and
a plurality of detectors corresponding to the plurality of diode lasers each sensitive to the select lasing frequency of the corresponding diode laser.

5. The sensing apparatus of claim 1 comprising a plurality of pitch optics each operatively associated with a distinct output of the pitch side beam controller and a corresponding plurality of catch optics each optically coupled to a distinct input of the catch side beam controller.

6. The sensing apparatus of claim 4 wherein the FBG optical fiber comprises a plurality of fiber Bragg gratings in series, each fiber Bragg grating being configured to partially reflect a portion of a laser beam of a distinct select lasing frequency while passing at least a portion of the laser beam to the FBG optical fiber output.

7. A method of sensing gas species characteristics within a process chamber, the method comprising:
providing a process chamber;
selectively projecting a beam of a first select lasing frequency though the process chamber;
optically coupling the beam projected through the process chamber to a detector sensitive to the select lasing frequency to detect an absorption dip at or near the select lasing frequency caused by a gas species characteristic of interest;
selectively projecting the beam of the first select lasing frequency through a fiber Bragg grating formed in a core of an optical fiber, the fiber Bragg grating being configured to partially reflect a beam of the first select lasing frequency while passing remainder of the beam, the remainder of the beam mimicking the absorption dip at the select lasing frequency caused by a gas species characteristic of interest;
optically coupling the at least a portion of the beam to the detector; and
monitoring an output of the detector to compare a transmission pattern of the FBG absorption dip to that produced in the process chamber.

8. The method of claim 7 further comprising:
maintaining each fiber Bragg grating at select temperature range, the select temperature range preventing substantial variation of optical properties of each fiber Bragg grating.

9. The method of claim 8 wherein the select temperature range is plus or minus 0.5 degrees Fahrenheit.

10. The method of claim 4 further comprising:
selectively projecting a multiplexed plurality of beams each of a select lasing frequency though the process chamber;
selectively projecting the beam of multiplexed beams through a fiber Bragg grating formed in a core of an optical fiber, the fiber Bragg grating being configured to partially reflect a beam of at least a first select lasing frequency while passing remainder of the beam, the remainder of the beam mimicking the absorption dip at the select lasing frequency caused by a gas species characteristic of interest;
demultiplexing the mutiplexed beams to separate each output beam by its distinct lasing frequency;
optically coupling each demultiplexed beam to a detector sensitive to the select lasing frequency of the corresponding demultiplexed output beam; and
monitoring an output of the detector to compare a transmission pattern of the FBG absorption dip to that produced in the process chamber at the same select lasing frequency.

11. The method of claim 10 further comprising providing a plurality of fiber Bragg gratings in series, each fiber Bragg grating being configured to partially reflect a portion of a laser beam of a distinct select lasing frequency while passing at least a portion of the laser beam to the FBG optical fiber output; and
monitoring an output of the detector to compare the transmission pattern of each of the FBG absorption dips to that produced in the process chamber at the same distinct lasing frequency.

12. The method of claim 7 further comprising:
processing the output of the detector to sense physical parameters within the process chamber.

13. The method of claim 12 further comprising:
sending signals through a feedback loop to a combustion controller to control select physical parameters within the process chamber based on the processed output of the detector.

* * * * *